(12) United States Patent
Berube

(10) Patent No.: US 10,421,170 B2
(45) Date of Patent: Sep. 24, 2019

(54) LINEAR DIVIDING INDEXER

(71) Applicant: Eric Alvin Berube, Ardrossan (CA)

(72) Inventor: Eric Alvin Berube, Ardrossan (CA)

( * ) Notice: Subject to any disclaimer, the term of this patent is extended or adjusted under 35 U.S.C. 154(b) by 201 days.

(21) Appl. No.: 15/685,890

(22) Filed: Aug. 24, 2017

(65) Prior Publication Data

US 2018/0056466 A1    Mar. 1, 2018

Related U.S. Application Data

(60) Provisional application No. 62/380,109, filed on Aug. 26, 2016.

(51) Int. Cl.
*B23Q 16/04* (2006.01)
*B23Q 16/08* (2006.01)

(52) U.S. Cl.
CPC .......... *B23Q 16/08* (2013.01); *B23Q 16/046* (2013.01)

(58) Field of Classification Search
CPC ...... B23Q 16/08; B23Q 15/22; B23Q 16/043; B23Q 16/046; B23Q 1/621; B23Q 35/02
USPC ....... 33/1 D, 568, 566, 567, 19.2, 477, 18.2, 33/32.1, 32.5, 32.7, 37, 26
See application file for complete search history.

(56) References Cited

U.S. PATENT DOCUMENTS

| | | | | |
|---|---|---|---|---|
| 650,856 A * | 6/1900 | Moyer | ...................... | B25H 7/04 33/26 |
| 1,336,241 A * | 4/1920 | La May | ..................... | B43L 7/12 33/26 |
| 2,559,982 A * | 7/1951 | McDowell | .............. | C03B 33/12 33/32.7 |
| 2,909,843 A * | 10/1959 | Bechtel | ................. | B43L 13/001 33/26 |
| 4,679,328 A * | 7/1987 | Saad | ...................... | B43L 13/004 33/447 |
| 4,939,968 A * | 7/1990 | Stoof | ..................... | B26D 7/015 269/303 |
| 4,965,935 A * | 10/1990 | Bourque | .................. | B25H 7/02 33/26 |
| 5,733,237 A * | 3/1998 | Marschke | .............. | B65H 45/12 493/405 |
| 6,872,177 B1 * | 3/2005 | Fullington | ................ | B31F 1/07 493/231 |
| 7,219,437 B2 * | 5/2007 | Dallman | ................. | B42F 9/002 33/18.2 |
| 8,701,303 B1 * | 4/2014 | Hales | ........................ | B31F 1/08 33/566 |
| 8,763,263 B2 * | 7/2014 | Dallman | .................. | B43L 3/00 33/18.2 |
| 2002/0152623 A1 * | 10/2002 | Chen | ..................... | B43L 13/045 33/430 |
| 2018/0056466 A1 * | 3/2018 | Berube | ................ | B23Q 16/046 |

* cited by examiner

*Primary Examiner* — Yaritza Guadalupe-McCall
(74) *Attorney, Agent, or Firm* — Bennett Jones LLP

(57) ABSTRACT

A linear dividing indexer has an upper table which moves transversely linear relative to a base. The upper table defines a slot disposed at an angle with the transverse direction of movement and includes an indexing mechanism formed from (a) an angle bar pivotally mounted to the base and an actuator bar slidably mounted in the angle bar, the actuating bar having a cam follower which slides within the upper table slot; and (b) wherein when the angle bar is at an angle to the slot, linear movement of the actuating bar within the angle bar causes transverse linear movement of upper table relative to the base.

7 Claims, 2 Drawing Sheets

LINEAR DIVIDING INDEXER

FIELD OF THE INVENTION

The present invention relates to an apparatus for indexing a work piece to create a linear series of precisely spaced locations for a machine operation.

BACKGROUND

In machine operations, it is often desired to create a precisely controlled spacing between linear machine operations, such as a series of evenly spaced holes drilled into a work piece using a drill press.

SUMMARY OF THE INVENTION

In one aspect, the invention comprises an upper table and a base, wherein the upper table may move transversely linear relative to the base, wherein the upper table defines a slot disposed at an angle with the transverse direction of movement, and an indexing mechanism comprising:

(a) an angle bar pivotally mounted to the base and an actuator bar slidably mounted in the angle bar, the actuating bar comprising a cam follower which slides within the upper table slot;

(b) wherein when the angle bar is at an angle to the slot, linear movement of the actuating bar within the angle bar causes transverse linear movement of upper table relative to the base.

Either or both of the angle bar and actuating bar may be marked so that a user may linearly move the actuating bar in even increments, which translates to movement of the upper table in even increments, proportional to the distance moved by the actuating bar. Preferably, either or both of the angle bar and actuating bar comprises a series of event spaced detents which facilitate movement of the actuating bar in precisely even increments.

As will be appreciated by one skilled in the art, the relative displacement of the upper table compared to the displacement of the actuating arm is dependent on the angle of the angle arm/actuating arm to the slot in the upper table. Where the angle arm/actuating arm is parallel to the slot, it will be aligned with the slot, and therefore, the upper table will be stationary despite any displacement of the actuating arm. Where the angle arm is parallel to the direction of movement of the upper table, the displacement of the actuating arm will be equal to the displacement of the upper table.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
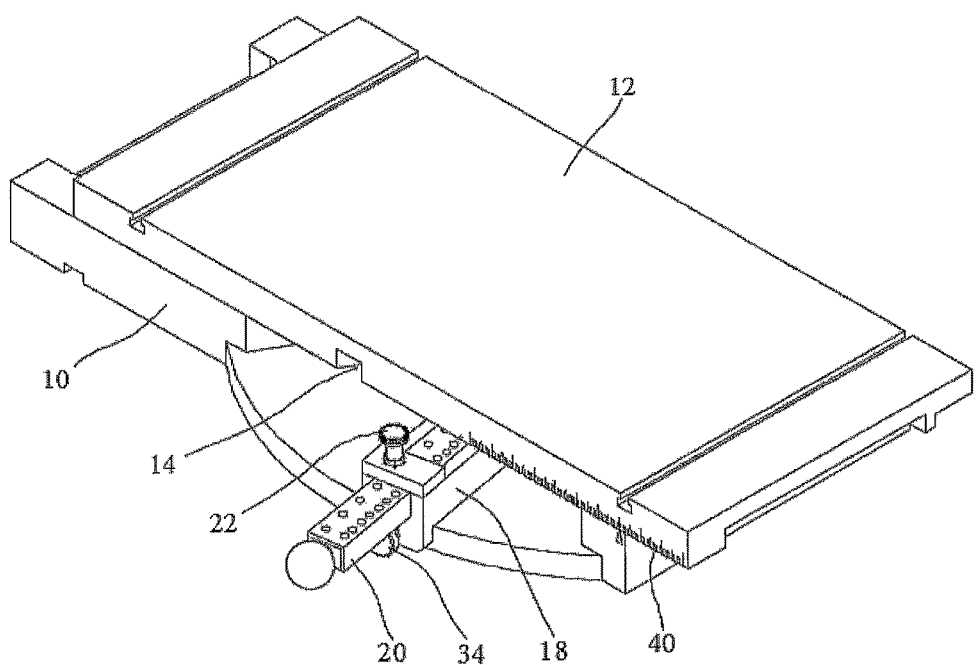
FIG. 1 shows an isometric view of one embodiment of the invention.
Figure 2:
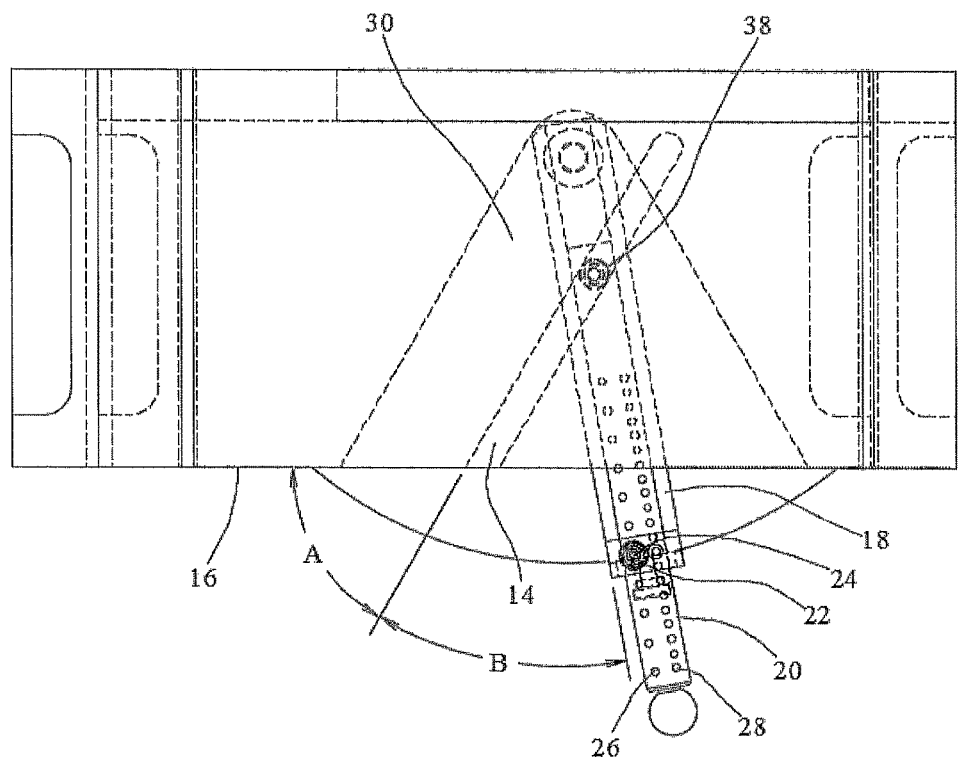
FIG. 2 shows a top plan view of the embodiment of FIG. 1.
Figure 3:
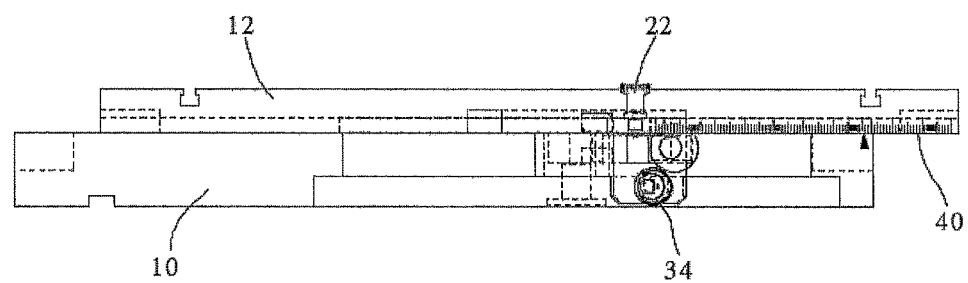
FIG. 3 shows a front view of the embodiment of FIG. 1.

In one embodiment, the invention comprises a base (10) and an upper table (12), wherein the upper table (12) may move linearly in a transverse direction relative to the base (10). The upper table defines a slot (14) on its lower surface, which slot is disposed at an angle A with a front edge (16) of the upper table. The angle A may be an acute angle or may be a right angle. In one preferred embodiment, the angle A is about 60 degrees.

An indexing mechanism disposed between the upper table (12) and the base (10) functions to move the upper table transversely relative to the base, in precise increments. The magnitude of movement varies with the position of the indexing mechanism.

In one embodiment, the indexing mechanism comprises an angle bar (18) pivotally mounted to the base and an actuator bar (20) slidably mounted in the angle bar (18). The actuating bar (20) comprises a cam follower (38) which slides within the upper table slot (14). When the angle bar (18) is at an angle B to the slot (14), linear movement of the actuating bar (20) within the angle bar (18) causes transverse movement of upper table (12) relative to the base (10). When the angle bar (18) is aligned with the slot (14), ie. angle B is zero, the upper table will not move. When angle B is 60 degrees, the transverse displacement of the upper table (12) will be equal to the movement of the actuating bar (20), ie. a 1 cm movement of the actuating bar relative to the angle bar results in a 1 cm movement of the upper table relative to the base.

Either or both of the angle bar (18) and actuating bar (20) may be marked or notched so that a user may linearly move the actuating bar in even increments, which translates to movement of the upper table in even increments, proportional to the distance moved by the actuating bar. Preferably, either or both of the angle bar and actuating bar comprises a series of evenly spaced detents which facilitate movement of the actuating bar in precisely even increments, and a locking mechanism (22) to hold the actuating bar in place. In one embodiment, the locking mechanism comprises a pin (24) disposed on the angle bar which fits into one of a plurality of evenly spaced holes (26) defined by the actuating bar. The pin (24) may be pulled up by a user to release the actuating bar (20).

In a preferred embodiment, the actuating bar may comprise at least one additional series of evenly spaced holes (28) with smaller spacing, providing for more increments if desired. The locking pin may be moved to align with the second series of openings (28).

The pivoting movement of the angle bar (18) may be accommodated by a triangular void (30) in the base. The pivoting attachment may be configured with sufficient friction that the angle bar may be easily positioned to a desired degree by a user, but remain in place throughout an indexing operation until moved again. Alternatively, a locking mechanism (34) such as a clamping knob which bears upon the base may be provided to lock the angle bar into a desired angle.

In one embodiment, ruler markings (40) may be provided on the upper table (12) to align with a stationary marker and indicate relative position of the upper table. A user may use the markers to position the angle bar to provide a desired spacing. For example, if a user desires 0.5 cm spacing, and the actuating bar defines 1.0 cm spacing, then the actuating bar may be pulled out to its 10.0 cm position, or 10 spaces, and the angle bar pivoted until the ruler marking is aligned at 5.0 cm. This method removes the effect of cumulative error that would arise if an individual increment distance was used to set the angle.

As will be appreciated by those skilled in the art, the indexer of the present invention may be used in any mechanical operation requiring precisely, evenly spaced movement of a workpiece. For example, the indexer may allow for a linear series of holes to be drilled using a drill press at exact spacing. The spacing provided is infinitely variable from 0% to 100% of the actuating bar spacing, depending on the angle B of the angle bar to the slot.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

What is claimed is:

1. A linear indexer comprising an upper table and a base, wherein the upper table is mounted to and may move transversely linear relative to the base, wherein the upper table defines a slot disposed at an angle with the transverse direction of movement, and an indexing mechanism comprising:
    (a) an angle bar pivotally mounted to the base and an actuator bar slidably mounted in the angle bar, the actuating bar comprising a cam follower which slides within the upper table slot;
    (b) wherein when the angle bar is at an angle to the slot, linear movement of the actuating bar within the angle bar causes transverse linear movement of upper table relative to the base.

2. The indexer of claim 1 wherein the slot is at an acute angle to the front edge of the upper table.

3. The indexer of claim 1 wherein the acute angle is 60 degrees.

4. The indexer of claim 1 wherein the actuating bar is mounted within an elongate linear channel defined by the angle bar.

5. The indexer of claim 4 comprising a locking mechanism for holding the actuating bar within a desired position in the angle bar.

6. The indexer of claim 5 wherein the locking mechanism comprises a removable pin disposed on the angle bar, which cooperates with a plurality of evenly spaced holes defined by the actuating bar.

7. The indexer of claim 6 wherein the actuating bar defines at least two series of evenly spaced holes where the spacing between holes is different for each series.

\* \* \* \* \*